April 7, 1964     R. F. O'NEILL     3,127,784
ANTI-BACKLASH GEARS
Filed Jan. 29, 1963
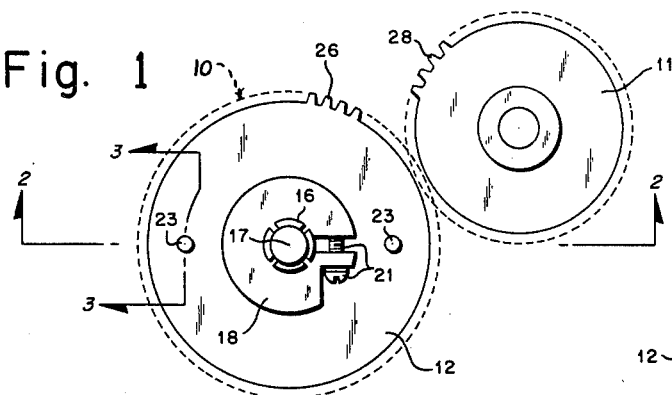
Fig. 1
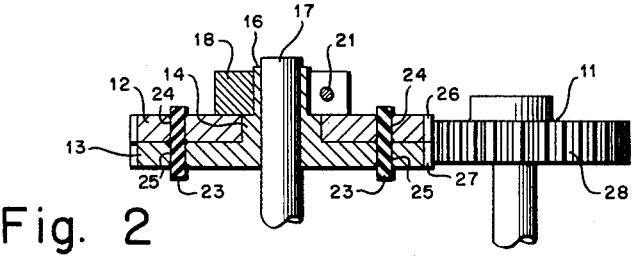
Fig. 2
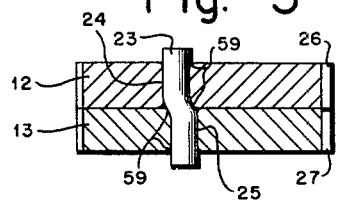
Fig. 3
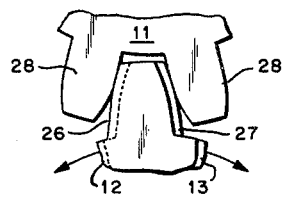
Fig. 4
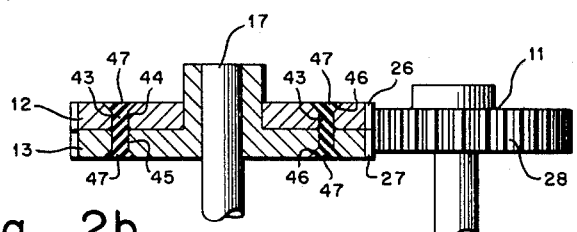
Fig. 2a
Fig. 2b
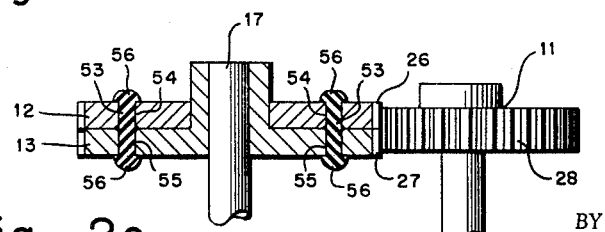
Fig. 2c
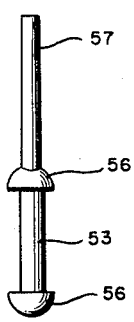
Fig. 5
INVENTOR.
ROBERT F. O'NEILL
BY
*Henry Hauser*
ATTORNEY

United States Patent Office 3,127,784
Patented Apr. 7, 1964

3,127,784
ANTI-BACKLASH GEARS
Robert F. O'Neill, 1613 Comly St., Philadelphia, Pa.
Filed Jan. 29, 1963, Ser. No. 254,841
1 Claim. (Cl. 74—440)
(Granted under Title 35, U.S. Code (1952), sec. 266)

The invention described herein may be manufactured and used by or for the Government of the United States of America for governmental purposes without the payment of any royalties thereon or therefor.

The present invention relates to anti-backlash gears and more particularly to an anti-backlash gear of the split gear type.

Gear trains are generally employed to either transmit power or motion. When a gear train is used for transmitting motion, as for example in a servomechanism, it is important that backlash in the gear train be kept to a minimum as it introduces error in the final result.

Various schemes have in the past been employed to reduce or eliminate backlash in gear trains. One commonly employed anti-backlash device comprises a first narrow width gear fixedly attached to a shaft and a second narrow width gear rotatable on the same shaft and contiguous with the first gear. The first and second gears are resiliently biased together by means of pins and coil springs which are normally engaged with a third gear equal in width to the combined widths of the first and second gears. This commonly employed device, usually designated a split gear train, performs satisfactorily in reducing or eliminating backlash but has the disadvantage of a large number of required parts. Some devices require as many as fifteen parts to make up a single assembly and obviously the opportunities for failure of a system employing such a device is greatly increased.

The anti-backlash device herein disclosed is of the split gear variety; however, the customary coil springs and retaining pin have been eliminated and a resilient slug system is employed to provide the necessary torque used in the split gear device.

Accordingly, it is an object of the present invention to provide an improved and reliable anti-backlash device that is relatively simple and inexpensive to make.

A further object of this invention is to provide an improved anti-backlash device which may be easily adapted to gear systems presently in use.

Still a further object of the present invention is to eliminate backlash due to manufacturing tolerances on the gears and to automatically compensate for the wearing of the running surfaces by a wedging action of the teeth.

Various other objects and advantages will appear from the following description of several embodiments of the invention and the novel features will be particularly pointed out hereinafter in connection with the appended claim.

In the drawing:

FIG. 1 is a plan view of the split gear and mating gear arrangement of the present invention;

FIG. 2 is a sectional view along the lines 2—2 of FIG. 1 and illustrates one embodiment of the present invention;

FIG. 2a is a sectional view of a second embodiment of the invention;

FIG. 2b is a sectional view of another embodiment of the present invention;

FIG. 2c is a sectional view of still another embodiment of the present invention;

FIG. 3 is a sectional view taken along lines 3—3 of FIG. 1;

FIG. 4 illustrates schematically the interaction of the teeth of the two biased gears and its mating gear; and FIG. 5 illustrates the resilient slug of the embodiment of FIG. 2c prior to its application.

Referring now to FIG. 1 it may be seen that the anti-backlash gears of the present invention comprise a split gear device generally noted at 10 meshing with a mating gear 11. As shown in FIGS. 1 and 2, the split gear device 10 is comprised of an upper spur gear 12 and a lower spur gear 13 having the same diametral pitch and the same number of teeth as gear 12. Integrally formed on the lower spur gear 13 is a cylindrical hub portion 14 having the upper spur gear 12 rotatably supported thereabout. An outwardly extending tubular shaft 16 extends from the cylindrical hub 14 and telescopically receives a rotatable shaft 17 extending, for example, from a servo motor. The shaft 17 is secured for complementary movement to the lower spur gear 13 by means of a C-shaped clamp 18 having the set screw 21 thereof threadably received within the opposite end-portion of the C-shaped clamp 18. The hollow tubular shaft 16 is thereby frictionally tightened about the servo shaft 17.

A pair of resilient cylindrical slugs or rods 23 made of neoprene or other appropriate material yieldingly couple the upper and lower spur gears 12 and 13 when the same are inserted into aligned apertures 24 and 25 formed in the upper and lower spur gears 12 and 13, respectively. It should be noted that when the upper and lower spur gears 12 and 13 are in the "at rest" position the apertures 24 and 25, respectively, are in alignment while the teeth 26 and 27, respectively are staggered. In order to place the split gear device 10 in its operative, biased, or anti-backlash position, the upper spur gear 12 is rotated about the cylindrical hub portion 14 and a prestress or prebias is placed in the rod 23, as shown in FIG. 3, until the teeth 26 and 27 align themselves sufficiently to be mated with the teeth 28 of the mating gear 11. As clearly seen in FIG. 2, the mating gear 11 is constructed of sufficient thickness and the teeth 28 thereon are so placed that they overlap and provide substantial mating contact with the teeth 26 and 27 of upper and lower gears 12 and 13. Upon release of the upper spur gear 12, the resilient cylindrical rod or slug 23 will attempt to return to the "at rest" or unbiased position. Referring to FIG. 4, this returning torque will cause the upper and lower teeth 26 and 27, respectively, to attempt to return to the staggered position whereby the mating teeth 28 will be wedged between the teeth 26 and 27. This is clearly illustrated by the direction of the arrows in FIG. 4. This urging of the biased rod 23 to return to its passive or normal position causing the teeth 26 and 27 to be wedged between an adjacent pair of mating teeth 28 precludes any backlash between the driving and mating teeth.

It should be noted that where particular conditions warrant, the wedging forces between teeth 26 and 27 and the teeth 28 on mating gear 11 may be varied by increasing the reactive force set up by the prebias or prestress. The increase in reactive force may be accomplished by utilizing rubber or other resilient material of varying hardness, by the location of the slug in relation to the center of the gear and the degree of rotation imparted to the upper spur gear 12 in relation to the spur gear 13. With relation to the latter mentioned method it should be noted, for example, that the alignment may be accomplished by rotating the upper spur gear 12 a distance equal to one and one-half the tooth pitch in order to align teeth 26 and 27 for meshing with the gear teeth 28 of the mating gear 11. In other words, where it is usually necessary to rotate gear 12 a distance equal to one-half a tooth pitch in order to permit a mating gear 11 to be engaged with gears 12 and 13, greater torque may be obtained by rotating gears 12 and 13 relative to one another additional units of tooth pitch until the desired torque is obtained.

Referring now to FIG. 2a, the embodiment shown therein illustrates the upper and lower gears being counterbored at 34 and 35 forming key slots in order to receive the resilent cylindrical key 36. This configuration would be utilized when clearance requirements dictate that no projection be provided beyond the confines of the gear surface.

Referring now to FIG. 2b, there is shown a flush type molded rod 43 received in the aligned apertures 44 and 45 formed in the upper and lower gears 12 and 13. The outer faces of gears 12 and 13 have been countersunk at 46 and filled with the head portion 47 of the cylindrical rod 43. This embodiment permits the elimination of clamp 18 since the slug itself will act as a fastening means to retain the upper and lower spur gears 12 and 13, respectively, in their operative position. The method of insertion of the rod 43 within the aperture is described as follows: The cylindrical rod 43 of a specified diameter is provided with a tapered lead, not shown, which is inserted through the preformed apertures 44 and 45 of a diameter slightly less than that of the rod. Upon the application of a pulling force, the cylindrical rod 43 decreased in diameter to that of the aperture and is then able to be pulled through the apertures 44 and 45. After the rod is inserted a sufficient distance the pulling force is released and the rod permitted to assume or attempt to assume its original diameter. The ends of the rod 43 retract toward the outer surfaces of the gears 12 and 13 and form a circular mass in the areas of the countersunk portions 46. These external masses are removed and a flush surface thereby obtained.

FIG. 2c illustrates another embodiment similar to that of FIG. 2b wherein the cylindrical rod 53 is inserted within the preformed apertures 54 and 55 in the upper and lower spur gears 12 and 13 and is formed with a molded head portion 56. Here, as in the embodiment of FIG. 2b, the molded slug with the button type head eliminates the clamp 18 and retains the split gear in its operative position. Referring to FIG. 2c and FIG. 5 it is seen that the slug 53 is placed in its operative position in a manner similar to that described above by inserting a tapered lead portion 57 into the preformed apertures and applying a pulling force until the head 56 passes through the aperture and seats itself about the periphery of the aperture. Lead 57 is then removed.

In order to remove the sharp corners which might shear the rubber slugs 23, 36, 43, 53, the upper and lower spur gears 12 and 13 have been formed with rounded portions 59 in the vicinity of the apertures formed in the abovementioned spur gears and is best illustrated in FIG. 3.

Although the embodiment shown herein illustrates the upper and lower spur gears to be of the same thickness it is contemplated that variable thickness gears may be utilized as long as the teeth of the mating gear 11 overlap the upper and lower teeth in the upper and lower spur gears 12 and 13.

It will be understood that various changes in the details, materials, steps and arrangements of parts which have been herein described and illustrated in order to explain the nature of the invention may be made by those skilled in the art within the principle and scope of the invention as expressed in the appended claim.

What is claimed is:

In a gear train,
a first gear having a coaxial, outwardly extending cylindrical hub and a coaxial tubular member extending from said hub,
a second gear coaxially and rotatably mounted about said cylindrical hub,
said first and second gears being in contacting relation and having the same diametral pitch and number of teeth thereon, said teeth of said first gear being staggered with respect to said teeth of said second gear,
a shaft extending through said tubular member and said hub,
means for clamping said tubular member to said shaft and for retaining said second gear in said contacting position,
a pair of aligned apertures formed in said first and second gears,
a pair of resilient rods extending through and filling said apertures,
and mating gear means having teeth thereon for meshing engagement with said teeth of said first and second gears when said latter mentioned teeth are urged into approximate alignment against the bias of said resilient rods; whereby said teeth of said first and second gears will be in wedged contact with said teeth of said mating gear.

References Cited in the file of this patent
UNITED STATES PATENTS
2,845,809     Hetzel _____ Aug. 5, 1958
FOREIGN PATENTS
560,469     Great Britain _____ Apr. 5, 1944